US008450443B2

(12) United States Patent
Williams et al.

(10) Patent No.: US 8,450,443 B2
(45) Date of Patent: May 28, 2013

(54) ANTIFOULING COATING COMPOSITION BASED ON CURABLE POLYORGANOSILOXANE POLYOXYALKYLENE COPOLYMERS

(75) Inventors: David Neil Williams, Newcastle Upon Tyne (GB); David Anthony Stark, Tyne & Wear (GB); Adrian James Lee, Tyne & Wear (GB); Cait Marie Davies, Tyne & Wear (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 12/598,384

(22) PCT Filed: Apr. 28, 2008

(86) PCT No.: PCT/EP2008/055130
§ 371 (c)(1),
(2), (4) Date: Oct. 30, 2009

(87) PCT Pub. No.: WO2008/132196
PCT Pub. Date: Nov. 6, 2008

(65) Prior Publication Data
US 2010/0137529 A1 Jun. 3, 2010

Related U.S. Application Data

(60) Provisional application No. 60/930,378, filed on May 15, 2007.

(30) Foreign Application Priority Data

May 1, 2007 (EP) ..................... 07107280

(51) Int. Cl.
*C08G 77/46* (2006.01)
*C08G 77/38* (2006.01)
(52) U.S. Cl.
USPC .............................. 528/15; 525/474; 525/476
(58) Field of Classification Search
None
See application file for complete search history.

(56) References Cited

U.S. PATENT DOCUMENTS

| 3,565,845 | A | * | 2/1971 | Johnson | 524/588 |
| 3,620,821 | A | * | 11/1971 | Johnson | 427/407.3 |
| 3,702,778 | A |   | 11/1972 | Mueller et al. | |
| 5,011,900 | A | * | 4/1991 | Yukimoto et al. | 525/477 |
| 5,138,009 | A | * | 8/1992 | Inoue | 528/15 |
| 5,227,410 | A | * | 7/1993 | Eckberg et al. | 522/75 |
| 5,472,686 | A | * | 12/1995 | Tsubaki et al. | 424/59 |
| 5,484,871 | A |   | 1/1996 | Stepp | |
| 5,539,013 | A | * | 7/1996 | Eckberg et al. | 522/75 |
| 5,807,955 | A |   | 9/1998 | Berger et al. | |
| 5,807,956 | A | * | 9/1998 | Czech | 528/28 |
| 5,900,458 | A | * | 5/1999 | Fujita et al. | 524/788 |
| 5,958,116 | A |   | 9/1999 | Kishihara et al. | |
| 6,242,554 | B1 | * | 6/2001 | Busch et al. | 528/28 |
| 6,906,161 | B2 |   | 6/2005 | Sakamoto et al. | |
| 7,662,984 | B2 | * | 2/2010 | Nakazawa et al. | 556/430 |
| 2004/0048996 | A1 | * | 3/2004 | Lange et al. | 528/10 |
| 2004/0082736 | A1 |   | 4/2004 | Sakamoto et al. | |
| 2006/0258818 | A1 | * | 11/2006 | Kimura et al. | 525/477 |
| 2006/0264545 | A1 | * | 11/2006 | Wakabayashi et al. | 524/394 |
| 2007/0021529 | A1 |   | 1/2007 | Boudjouk et al. | |
| 2007/0287780 | A1 | * | 12/2007 | Wakabayashi et al. | 524/188 |
| 2010/0048795 | A1 | * | 2/2010 | Kennan et al. | 524/500 |
| 2010/0168325 | A1 | * | 7/2010 | Gough et al. | 524/588 |

FOREIGN PATENT DOCUMENTS

| EP | 0 903 389 | 3/1999 |
| EP | 1 254 192 | 11/2002 |
| GB | 1 307 001 | 2/1973 |
| WO | WO 01/49774 | 7/2001 |
| WO | WO 2004031299 A1 * | 4/2004 |
| WO | WO 2004/081121 | 9/2004 |

OTHER PUBLICATIONS

International Search Report and Written Opinion, PCT International Patent Application No. PCT/EP2008/055130, dated Aug. 14, 2008.
Search Report, European Patent Application No. 07107280, dated Oct. 12, 2007.
International Preliminary Report on Patentability, PCT International Patent Application No. PCT/EP2008/055130, dated Nov. 3, 2009.

* cited by examiner

*Primary Examiner* — Robert S Loewe
(74) *Attorney, Agent, or Firm* — Kenyon & Kenyon LLP

(57) ABSTRACT

A process to physically deter fouling from a substrate in an aquatic fouling environment, which process comprises forming on the substrate, before exposure to the said environment, a coating composition comprising (i) a curable polyorganosiloxane polyoxyalkylene block copolymer having at least two reactive groups X situated on the copolymer chain and (ii) an organosilicon crosslinking agent and/or a catalyst.

15 Claims, No Drawings

ANTIFOULING COATING COMPOSITION BASED ON CURABLE POLYORGANOSILOXANE POLYOXYALKYLENE COPOLYMERS

REFERENCE TO RELATED APPLICATION(S)

This application is the U.S. National Phase of PCT/EP2008/055130 filed on Apr. 28, 2008 and claims the benefit of U.S. Provisional Application No. 60/930,378 filed on May 15, 2007.

This invention relates to a process to physically deter fouling from a substrate in an aquatic environment using a polyorganosiloxane-containing coating composition and a substrate coated with said coating composition.

Man-made structures such as boat hulls, buoys, drilling platforms, dry dock equipment, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins may have if released into the aquatic environment. There is accordingly a need for non-fouling coatings which do not release markedly toxic materials.

It has been known for many years, for example as disclosed in GB 1,307,001 and U.S. Pat. No. 3,702,778, that silicone rubber coatings resist fouling by aquatic organisms. It is believed that such coatings present a surface to which the organisms cannot easily adhere, and they can accordingly be called fouling-release rather than anti-fouling coatings. Silicone rubbers and silicone compounds generally have very low toxicity. The disadvantage of this anti-fouling system when applied to boat hulls is that although the accumulation of marine organisms is reduced, relatively high vessel speeds are needed to remove all fouling species. Thus, in some instances, it has been shown that for effective release from a hull that has been treated with such a polymer, it is necessary to sail with a speed of at least 14 knots. For this reason silicone rubbers have gained limited commercial success and there is a need for improvement of the anti-fouling and fouling-release properties of these environmentally benign coatings.

U.S. Pat. No. 6,906,161 discloses a room-temperature curable antifouling coating composition comprising an organopolysiloxane with at least one side group of the formula $-R^2-Si(R^3)_2-O-(R^4O)_b-R^5$ bonded to a silicon atom within each molecule. In this formula, b is an integer from 1-30, $R^2$ and $R^3$ are hydrocarbon groups of 1-6 carbon atoms, $R^4$ is an alkylene group of 2-4 carbon atoms, and $R^5$ is a hydrocarbon group of 1-8 carbon atoms or a group represented by $-R^6-SiX^3$, wherein $R^6$ is a hydrocarbon group of 1-6 carbon atoms and X is a hydrolysable group.

WO 2004/081121 discloses an antifouling coating composition comprising a copolymer obtained by polymerising a monomer mixture comprising a Si-containing monomer having two (meth)acryl end groups and which contains a divalent metal atom.

It has now been found that the physical deterrence of marine fouling can be further reduced, even under static conditions, by using a coating composition comprising a specific copolymer.

The present invention therefore relates to a process to physically deter fouling from a substrate in a aquatic fouling environment, which process comprises forming on the substrate, before exposure to the said environment, a coating composition comprising (i) a curable polyorganosiloxane polyoxyalkylene block copolymer having at least two reactive groups X situated on the polymer chain and (ii) an organosilicon crosslinking agent and/or a catalyst.

If said groups X are not reactive with each other, the coating composition contains an organosilicon crosslinking agent having at least two groups Y reactive with the said groups X. In addition, it may also contain a catalyst in order to promote crosslinking. If the polyorganosiloxane polyoxyalkylene copolymer has only two reactive groups X per molecule which are not reactive with each other, the coating composition contains an organosilicon crosslinking agent having on average more than two reactive groups Y per molecule.

If said groups X are reactive with each other, the coating composition contains a catalyst to promote crosslinking. In addition, it may also contain an organosilicon crosslinking agent having at least two groups Y reactive with the said groups X.

The copolymer does not require the presence of a divalent metal such as Mg, Zn, or Cu. Hence, in a preferred embodiment, the copolymer does not contain such a metal.

This coating composition is applied to a substrate and cured to form a coated substrate. The resulting coating will consist of a water-insoluble hydrophilic polymer network comprising polyorganosiloxane polyoxyalkylene block copolymer chains linked to each other by bonds between crosslinking sites on the polyorganosiloxane polyoxyalkylene block copolymer chains and/or through an organosilicon crosslinking moiety which is bonded to crosslinking sites on the polyorganosiloxane polyoxyalkylene block copolymer chains. In a preferred embodiment, the crosslinks between the polyorganosiloxane polyoxyalkylene block copolymer chains are substantially free of Si—O—C linkages.

The Polyorganosiloxane Polyoxyalkylene Block Copolymer

Within this specification, a block copolymer is defined as an essentially linear copolymer with chains composed of homo-polymeric blocks which are linked together. These blocks can be linked in any fashion, e.g. alternating or random. Preferably, the polyorganosiloxane blocks present in the block copolymer contain, independent of each other, 5-30 siloxane units. More preferably, the polyoxyalkylene blocks contain, independent of each other, 2-30 oxyalkylene units.

A first preferred type of polyorganosiloxane polyoxyalkylene block copolymer is a polyorganosiloxane-terminated block copolymer of the form PS-(A-PO-A-PS)$_n$, wherein PS represents a polyorganosiloxane block, PO represents a polyoxyalkylene block, A represents a divalent moiety, and n has a value of at least 1, preferably 10-250.

Other block copolymers can be used, for example a branched block copolymer, a polyoxyalkylene-terminated block copolymer or a block copolymer having polyorganosiloxane and polyoxyalkylene terminal blocks. In a preferred embodiment, the reactive groups X are each situated on a silicon atom of the block copolymer, although this is not essential if the copolymer is used with an organosilicon crosslinking agent. Even more preferably, the reactive groups X are situated in a polyorganosiloxane block of the copolymer. The crosslinkable reactive groups X can for example be situated on terminal silicon atoms of a polyorganosiloxane block of the copolymer, particularly if the copolymer is of the form PS-(A-PO-A-PS)$_n$.

In one embodiment, the polyorganosiloxane polyoxyalkylene block copolymer has the form PS'-(A-PO-A-PS')$_n$, wherein PS' represents a polyorganosiloxane block terminated with an alkoxy-substituted silicon atom of the formula —Si(R')(R')—OR, wherein R represents an alkyl group having 1 to 4 carbon atoms and each R' represents an alkyl group having 1 to 6 carbon atoms, a phenyl group, or an alkoxy group of the formula —OR. Examples of such groups are trimethoxysilyl, triethoxysilyl, methyldiethoxysilyl, methyldimethoxysilyl, dimethylmethoxysilyl, and dimethylethoxysilyl.

A polyorganosiloxane polyoxyalkylene block copolymer of the form PS-(A-PO-A-PS)$_n$ can be prepared in a hydrosilylation reaction by reacting a polyorganosiloxane having two Si—H groups with a polyether containing two ethylenically unsaturated groups in an amount such that the Si—H groups are present in excess over the ethylenically unsaturated groups. By ethylenically unsaturated group we mean a group of the formula >CH=CH$_2$. The reaction is generally carried out in the presence of a hydrosilylation catalyst such as a platinum group metal or a compound thereof. The divalent moieties A resulting from such a hydrosilylation reaction are alkylene moieties, having for example 2 to 6 carbon atoms depending on the ethylenically unsaturated group of the polyether.

The polyorganosiloxane which is reacted with the polyether can be branched, but is preferably a linear polydiorganosiloxane having a degree of polymerisation (DP) of 2 to 250 siloxane units, more preferably 2 to 100 siloxane units, and most preferably 4 to 40 siloxane units. The organic groups of the polyorganosiloxane are preferably selected from phenyl groups and alkyl groups having 1 to 18, preferably 1 to 6 carbon atoms. Most preferably, at least 90% of the organic groups attached to Si are methyl groups; for example, the polyorganosiloxane is a Si—H functional polydimethylsiloxane. The polyorganosiloxane can contain more than two Si—H groups, but this is likely to lead to a branched polyorganosiloxane polyoxyalkylene copolymer. Most preferably, the polyorganosiloxane has only two Si—H groups, one at each end of the polydiorganosiloxane chain, so that reaction with the polyether produces a polyorganosiloxane-terminated block copolymer with reactive Si—H groups situated on the terminal silicon atoms of the polyorganosiloxane blocks of the copolymer, as shown in the reaction scheme below.

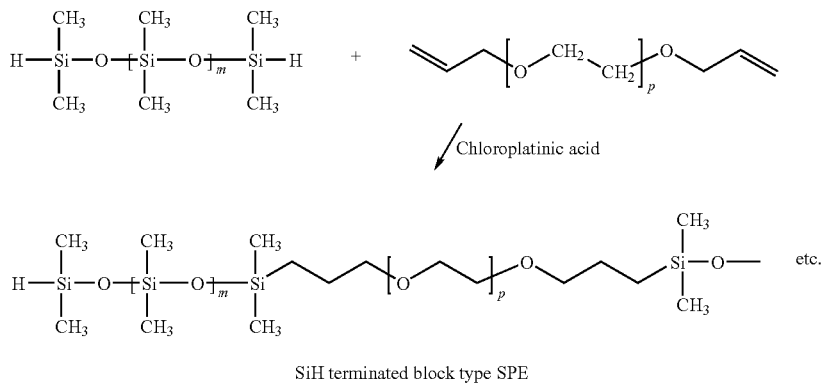

SiH terminated block type SPE

Polyorganosiloxanes having Si—H groups on non-terminal siloxane units, or on both terminal and non-terminal siloxane units, can alternatively be used.

In order to give the required hydrophilic properties, it is preferred that at least 50% of the polyoxyalkylene units in the polyoxyalkylene block are oxyethylene units. It is therefore preferred that the polyether used to prepare the polyorganosiloxane polyoxyalkylene block copolymer is a polyethylene oxide, although a poly(oxyethylene oxypropylene) copolymer having a majority of polyoxyethylene units can also be used. The ethylenically unsaturated groups of the polyether can for example be allyl, vinyl, hexenyl or isobutenyl groups. One example of a preferred polyether is polyethylene glycol diallyl ether. The polyethylene oxide preferably has a degree of polymerisation of 4 to 100, more preferably 4 to 40 oxyethylene units. The molar ratio of oxyalkylene, for example oxyethylene, units to siloxane units in the polyorganosiloxane polyoxyalkylene copolymer preferably is in the range of 0.05:1 to 0.5:1.

The Si—H-functional polyorganosiloxane and the polyether containing ethylenically unsaturated groups are preferably reacted in a molar ratio of Si—H groups to ethylenically unsaturated groups in the range of 1.5:1 to 6:1, more preferably 2:1 to 4:1. The reaction can be carried out at ambient temperature, but an elevated temperature in the range 60 to 200° C., for example 100 to 150° C., may be preferred. The reaction is generally carried out in the presence of a catalyst comprising a platinum group metal such as platinum or rhodium. One preferred platinum catalyst is hexachloroplatinic acid or a reaction product of chloroplatinic acid and an organosilicon compound containing terminal aliphatic unsaturation; another is a platinum divinyl tetramethyl disiloxane complex. The catalyst is preferably used in amounts from 0.00001-0.5 parts platinum or rhodium per 100 weight parts of the Si—H-functional polyorganosiloxane, most preferably 0.00001-0.002 parts.

The Si—H-functional polyorganosiloxane and the polyether containing ethylenically unsaturated groups can alternatively be reacted using a molar excess of the polyether containing ethylenically unsaturated groups, for example at a molar ratio of Si—H groups to ethylenically unsaturated groups in the range of 1:1.5 to 1:6, thereby producing a block copolymer of the form PO-(A-PS-A-PO)$_n$, wherein PO, PS and A are defined as above and the PO blocks have terminal ethylenically unsaturated groups. Such a block copolymer can be crosslinked by an organo-silicon crosslinking agent having reactive Si—H groups, for example poly(methyl hydrogen siloxane) or a methyl hydrogen siloxane dimethylsiloxane copolymer, to produce a water-insoluble hydrophilic polymer network according to the invention. Alternatively, the terminal ethylenically unsaturated groups can be reacted with a suitable silane to convert them into reactive groups X.

The Organosilicon Crosslinking Agent

As mentioned above, if the groups X situated on a polyorganosiloxane block of the copolymer are not reactive with each other, the coating composition used in the present invention requires the presence of an organosilicon crosslinking agent having at least two groups Y reactive with the said groups X.

In addition, the composition may contain a catalyst.

If the polyorganosiloxane polyoxyalkylene block copolymer has only two reactive groups X per molecule, the composition contains an organosilicon crosslinking agent having on average more than two reactive groups Y per molecule, for example 2.5 to 6 reactive groups per molecule, to aid network formation (crosslinking) rather than only chain extension. For example, if the organosilicon crosslinking moiety is a branched polyorganosiloxane containing at least three reactive groups Y, it can become bonded to at least three polymer chains.

Examples of suitable groups X are Si—H groups, Si-alkoxy groups, silanol groups, amine groups, carboxylic acid groups, thiol groups, epoxy groups, ketoxime groups, acetoxy groups, and ethylenically unsaturated groups.

Groups Y that are reactive with one or more of these groups X can be selected from the same list, the choice being dependent on their respective reactivity with the selected group X.

When the Groups X are Si—H Groups

If the reactive groups X are Si—H groups, the organosilicon crosslinking agent can contain ethylenically unsaturated groups Y. Such an organosilicon crosslinking agent preferably is a polysiloxane. The polysiloxane can for example consist of siloxane units selected from Q units of the formula (SiO$_{4/2}$), T units of the formula R$^c$SiO$_{3/2}$, D units of the formula R$^b_2$SiO$_{2/2}$, and M units of the formula R$^a_3$SiO$_{1/2}$, wherein the R$^a$, R$^b$, and R$^c$ substituents are selected from alkyl and alkenyl groups having 1 to 6 carbon atoms, at least three R$^a$, R$^b$ and/or R$^c$ substituents being alkenyl units.

If the polyorganosiloxane polyoxyalkylene block copolymer is of the form PS-(A-PO-A-PS)$_n$, wherein the reactive Si—H groups X are situated on the terminal silicon atoms of the polyorganosiloxane blocks, one suitable type of crosslinking agent is a branched polyorganosiloxane having ethylenically unsaturated groups Y situated on at least three branches. Such a branched polyorganosiloxane generally comprises Q and/or T units, M units and optionally D units. The alkenyl groups are preferably present in M units. The polyorganosiloxane can for example be a branched siloxane comprising one or more Q units of the formula (SiO$_{4/2}$), from 0 to 250 D units of the formula R$^b_2$SiO$_{2/2}$, and M units of the formula R$^a$R$^b_2$SiO$_{1/2}$, wherein the R$^a$ and R$^b$ substituents are selected from alkyl and alkenyl groups having 1 to 6 carbon atoms, at least three R$^a$ substituents in the branched siloxane being alkenyl units. If the polyorganosiloxane polyoxyalkylene block copolymer is of relatively high chain length, a low molecular weight Q-branched siloxane crosslinking agent may be preferred, for example a vinyl-functional Q-branched siloxane comprising a Q unit, four dimethylvinylsilyl M units, and 0 to 20 dimethylsiloxane D units, which may have the formula:

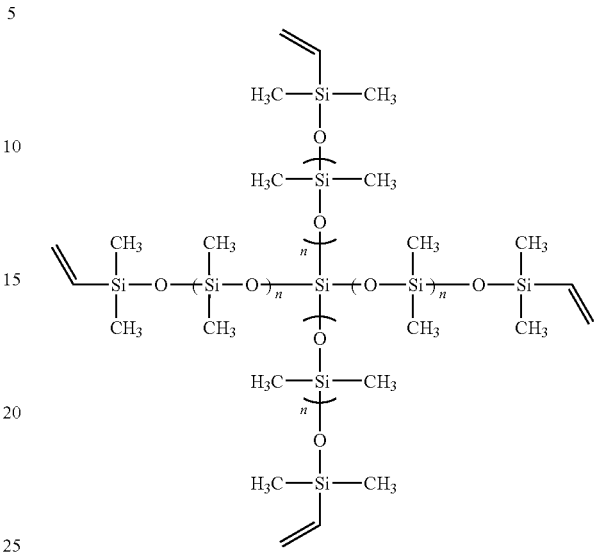

If the polyorganosiloxane polyoxyalkylene block copolymer contains more than two Si—H groups, the organosilicon crosslinking agent need not contain more than two ethylenically unsaturated groups. For example, the crosslinking agent can be a polydiorganosiloxane containing two ethylenically unsaturated groups such as a dimethylvinylsilyl-terminated polydimethylsiloxane, or it can be a mixture of such a polydiorganosiloxane containing two ethylenically unsaturated groups with a branched polyorganosiloxane having ethylenically unsaturated groups Y situated on at least three branches.

If the polyorganosiloxane polyoxyalkylene block copolymer contains reactive groups X which are Si—H groups and the organosilicon crosslinking agent contains ethylenically unsaturated groups Y, they are generally reacted in the presence of a catalyst comprising a platinum group metal such as platinum or rhodium. Preferred platinum catalysts are as described above. The catalyst is preferably used in amounts from 0.00001-0.5 parts platinum or rhodium per 100 weight parts of the Si—H-functional polyorganosiloxane polyoxyalkylene block copolymer. The polyorganosiloxane polyoxyalkylene block copolymer containing Si—H groups and the organosilicon crosslinking agent are preferably reacted in a molar ratio of Si—H groups to ethylenically unsaturated groups in the range of 1.5:1 to 6:1, more preferably 2:1 to 4:1. The crosslinking reaction can be carried out at ambient temperature but proceeds faster at an elevated temperature in the range of 60 to 200° C.

Because the crosslinking reaction proceeds at ambient temperature when the polyorganosiloxane polyoxyalkylene block copolymer containing Si—H groups, the crosslinking agent containing ethylenically unsaturated groups, and the catalyst are all in contact, it may be preferred to package a curable coating composition based on such reactive groups in two containers, so that the polyorganosiloxane polyoxyalkylene block copolymer, the crosslinking agent, and the catalyst are not all together in the same package. The contents of the two containers can be mixed shortly before application. For example, the catalyst can be packaged with the crosslinking agent containing ethylenically unsaturated groups, the polyorganosiloxane polyoxyalkylene block copolymer containing Si—H groups being in a separate container. Alternatively, the polyorganosiloxane polyoxyalkylene block copolymer and the crosslinking agent can be packaged together, and the catalyst can be packed separately, optionally with part of the polyorganosiloxane polyoxyalkylene block copolymer component or part of the crosslinking agent component.

When the Groups X are Si-Alkoxy or Silanol Groups

If the reactive groups X are Si-alkoxy groups, they can react with (i) each other in the presence of moisture and a catalyst or (ii) the reactive groups Y on the crosslinking agent, if present, being either Si-alkoxy or silanol groups.

If the reactive groups X are silanol groups, they can react with the reactive groups Y on the crosslinking agent selected from alkoxy, acetoxy, ketoxime, amide or hydroxyl groups bonded to silicon.

The coating can thus comprise polyorganosiloxane polyoxyalkylene block copolymer chains linked to each other through Si—O—Si linkages derived from Si-alkoxy crosslinking sites on the ends of the polyorganosiloxane polyoxyalkylene block copolymer chains.

The reactive groups X on the polyorganosiloxane polyoxyalkylene block copolymer can for example be present in groups of the formula —Si(R')$_2$—OR, wherein R represents an alkyl group having 1 to 4 carbon atoms and each R' represents an alkyl group having 1 to 6 carbon atoms, a phenyl group, or an alkoxy group of the formula —OR. Examples of such groups are trimethoxysilyl, triethoxysilyl, methyldiethoxysilyl, methyldimethoxysilyl, dimethylmethoxysilyl, and dimethylethoxysilyl.

The reactive groups Y on the crosslinking agent can also be present in groups of the formula —Si(R')$_2$(OR), wherein R and R' have the meanings given above. In its simplest form the crosslinking agent can be a tetraalkyl orthosilicate such as tetramethyl, tetraethyl, tetrapropyl, or tetrabutyl orthosilicate, a trialkoxysilane, for example an alkyltrialkoxysilane such as methyltrimethoxysilane, methyltriethoxysilane, ethyltriethoxysilane or n-octyltriethoxysilane, or a dialkoxysilane, for example a dialkyldimethoxysilane such as dimethyldimethoxysilane, or a dialkyl-diethoxysilane such as dimethyldiethoxysilane.

If the polyorganosiloxane polyoxyalkylene block copolymer contains only two Si-bonded alkoxy groups, the organosilicon crosslinking agent should contain more than two Si-bonded alkoxy groups; for example, it can be a trialkoxysilane or a polysiloxane containing at least one —Si(OR)$_3$ unit, wherein R is defined as above, a polysiloxane containing at least two —Si(R")(OR)$_2$ units, or a polysiloxane containing at least three —Si(R")$_2$(OR) units, wherein R" is an alkyl group having 1 to 6 carbon atoms.

If the polyorganosiloxane polyoxyalkylene block copolymer contains more than two Si-bonded alkoxy groups, an organosilicon crosslinking agent containing only two Si-bonded alkoxy groups and/or an organosilicon crosslinking agent containing more than two Si-bonded alkoxy groups can be used. Alternatively, such a polyorganosiloxane polyoxyalkylene block copolymer containing more than two Si-bonded alkoxy groups can be cured by reaction of the Si-alkoxy groups with each other in the presence of moisture, and preferably a condensation catalyst, without need for a further crosslinking agent.

A polyorganosiloxane polyoxyalkylene block copolymer containing more than two Si-bonded alkoxy groups is a self-crosslinkable polymer which can cure to a water-insoluble hydrophilic polymer network. An example of such a copolymer is a polyorganosiloxane polyoxyalkylene block copolymer terminated with —Si(R'$_2$)(OR)$_2$ units, wherein R and R' are defined as above. For example, a block copolymer of the form PS-(A-PO-A-PS)$_n$, wherein the reactive Si(R')(OR)$_2$ units are situated on the terminal silicon atoms of the polyorganosiloxane blocks.

The polyorganosiloxane polyoxyalkylene block copolymer containing Si-bonded alkoxy groups can alternatively be a block copolymer of the form PO-(A-PS-A-PO)$_n$. Such a block copolymer having terminal ethylenically unsaturated groups can be prepared as described above and can be reacted with a silane of the formula H—Si(R')$_2$(OR), wherein R and R' are defined as above, to convert the ethylenically unsaturated groups into reactive groups of the formula —Si(R')$_2$(OR) containing 1, 2 or 3 reactive alkoxy groups each attached to a silicon atom in the polyorganosiloxane polyoxyalkylene block copolymer. Examples of such silanes are trimethoxysilane, triethoxysilane, methyldiethoxysilane, and dimethylethoxysilane.

Usually, it is preferred that the crosslinking agent, if used, is an organopoly-siloxane, for example a polydiorganosiloxane such as polydimethylsiloxane having end units of the formula —Si(R')$_2$(OR), particularly such end units where at least one of the R' groups is an alkoxy group, or a branched polyorganosiloxane in which each branch is terminated with a group of the formula —Si(R')$_2$(OR). It will be appreciated that some crosslinking between polyorganosiloxane polyoxyalkylene block copolymer chains terminated with reactive groups of the formula —Si(R')$_2$(OR) may take place even when a crosslinking agent is present. It may be preferred to use a minor amount of crosslinking agent to control the properties of the cured polymer composition. For example, a branched polyorganosiloxane containing Si-alkoxy groups can be added to increase the degree and/or density of the crosslinks, leading to a harder cured polymer composition. An alkoxy-terminated polydiorganosiloxane of relatively high chain length, for example polydimethylsiloxane of DP 100 up to 250 or even 500, can be added to decrease the crosslink density, leading to a more flexible cured polymer composition. The overall proportion of alkoxy-functional polyorganosiloxane polyoxyalkylene copolymer to other alkoxy-functional polyorganosiloxane(s) can be any value in the range of 100:0 to 1:99.

The Si-alkoxy groups react with each other in the presence of moisture to form Si—O—Si linkages. This reaction can proceed, even at ambient temperature, without a catalyst, but proceeds much more rapidly in the presence of a siloxane condensation catalyst. Any suitable polycondensation catalyst may be utilised. These include protic acids, Lewis acids, organic and inorganic bases, transition metal compounds, metal salts, and organometallic complexes.

The siloxane condensation catalyst can for example comprise a compound of a transition metal selected from titanium, zirconium, and hafnium. Preferred titanium compounds are titanium alkoxides, otherwise known as titanate esters. Zirconium alkoxides (zirconate esters) or hafnium alkoxides can alternatively be used. Titanate and/or zirconate based catalysts may comprise a compound according to the general formulae Ti[OR$^5$]$_4$ and Zr[OR$^5$]$_4$, respectively, wherein each R$^5$ may be the same or different and represents a monovalent, primary, secondary or tertiary aliphatic hydrocarbon group, which may be linear or branched, containing from 1 to 10 carbon atoms. Optionally, the titanate may contain partially unsaturated groups. However, preferred examples of R$^5$ include but are not restricted to methyl, ethyl, propyl, isopropyl, butyl, tertiary butyl, and a branched secondary alkyl group such as 2,4-dimethyl-3-pentyl. Preferably, when each R$^5$ is the same, R$^5$ is an isopropyl, branched secondary alkyl group or tertiary alkyl group, in particular, tertiary butyl. Alternatively, the titanate may be chelated. The chelation may be with any suitable chelating agent such as an alkyl acetylacetonate such as methyl or ethylacetyl-acetonate. Any suitable chelated titanates or zirconates may be utilised. Preferably, the chelate group used is a monoketoester such as acetylacetonate and alkylacetoacetonate, giving chelated titanates such as for example diisopropyl bis(acetylacetonyl) titanate, diisopropyl bis(ethylacetoacetonyl)titanate, diisopropoxytitanium bis(ethylacetoacetate), and the like. Examples of suitable catalysts are additionally described in EP1254192 and WO200149774.

The amount of transition metal compound such as titanate ester present as catalyst can for example be 0.01-2%, based on the weight of polyorganosiloxane polyoxyalkylene copolymer plus crosslinking agent.

Further suitable condensation catalysts which may be used as the catalyst for the polymerisation reaction in the present invention include condensation catalysts incorporating tin, lead, antimony, iron, cadmium, barium, manganese, zinc, chromium, cobalt, nickel, aluminium, gallium or germanium. Examples include iron stearate, lead octoate, metal triflates, organic tin metal catalysts such as triethyl tin tartrate, stannous octoate, tin oleate, tin naphthate, butyl tin tri-2-ethylhexoate, tin butyrate, carbomethoxyphenyl tin trisuberate, isobutyl tin triceroate, and diorganotin salts, especially diorganotin dicarboxylate compounds such as dibutyl tin dilaurate, dimethyl tin dibutyrate, dibutyl tin dimethoxide, dibutyl tin diacetate, dimethyl tin bisneodecanoate, dibutyl tin dibenzoate, dimethyl tin dineodeconoate, dibutyl tin acetoacetonate or dibutyl tin dioctoate.

Further, the catalyst may be an organobismuth or organophosphate such as bis(2-ethyl-hexyl)hydrogen phosphate, or it may comprise a halogenated organic acid which has at least one halogen substituent on a carbon atom which is in the α-position relative to the acid group and/or at least one halogen substituent on a carbon atom which is in the β-position relative to the acid group, or a derivative which is hydrolysable to form such an acid under the conditions of the condensation reaction.

The catalyst can alternatively be a Lewis acid catalyst—a "Lewis acid" is any substance that will take up an electron pair to form a covalent bond—for example, boron trifluoride, $FeCl_3$, $AlCl_3$, $ZnCl_2$, $ZnBr_2$, catalysts of the formula $M^1R^4_fX^1_g$, wherein $M^1$ is B, Al, Ga, In or TI, each $R^4$ is independently the same (identical) or different and represents a monovalent aromatic hydrocarbon moiety having from 6 to 14 carbon atoms, such monovalent aromatic hydrocarbon moieties preferably having at least one electron-withdrawing element or group such as $-CF_3$, $-NO_2$ or $-CN$, or substituted with at least two halogen atoms; $X^1$ is a halogen atom; f is 1, 2, or 3; and g is 0, 1 or 2; with the proviso that f+g=3. One example of such a catalyst is $B(C_6F_5)_3$.

An example of a base catalyst is an amine or a quaternary ammonium compound such as tetramethylammonium hydroxide. Amine catalysts can be used alone or in conjunction with another catalyst such as a tin carboxylate or organotin carboxylate; for example, laurylamine may be particularly effective with such a tin compound.

Since a polyorganosiloxane polyoxyalkylene block copolymer having Si-alkoxy groups and a crosslinking agent having Si-alkoxy groups do not react in the absence of moisture, even in the presence of a catalyst, a curable composition based on them can be stored in a single container, provided that the reagents are dry and the container is moisture-proof. Upon opening of the container, the curable composition can be applied to a surface and will generally cure in the presence of atmospheric moisture. Curing proceeds rapidly at ambient temperature in the presence of a catalyst, particularly a titanium tetraalkoxide or a chelated titanium alkoxide.

One type of curable composition according to the invention comprises a polyorganosiloxane polyoxyalkylene block copolymer containing Si-alkoxy groups, optionally a crosslinking agent having Si-alkoxy groups, and a siloxane condensation catalyst, the composition being packed in a moisture-proof container.

Although the hydrosilylation reaction to produce a polyorganosiloxane polyoxyalkylene block copolymer terminated with reactive Si—H groups can be carried out readily under factory conditions, systems based on such copolymers do not give fast curing at ambient temperature. It may therefore be preferred to convert the Si—H terminated polyorganosiloxane polyoxyalkylene copolymer into a copolymer terminated with another reactive group. The Si—H groups can in general be reacted with a compound containing an ethylenically unsaturated group which reacts with the Si—H group and another reactive group, such as Si-alkoxy, which is not reactive with Si—H but forms the reactive groups X of the resulting polymer. For example, reactive groups of the formula $-Si(R')_2(OR)$, wherein R and R' have the meanings given above, can be introduced into a Si—H functional copolymer, for example by reaction with an ethylenically unsaturated alkoxysilane of the formula $Z-Si(R')_2(OR)$, wherein Z is an ethylenically unsaturated group such as vinyl, allyl, isobutenyl or 5-hexenyl. Examples of such ethylenically unsaturated alkoxysilanes are vinyl trimethoxysilane, allyl trimethoxysilane and methylvinyl dimethoxysilane. If the Si—H terminated polyorganosiloxane polyoxyalkylene block copolymer is of the formula $PS\text{-}(A\text{-}PO\text{-}A\text{-}PS)_n$ as defined above, a polyorganosiloxane polyoxyalkylene block copolymer of the form $PS'\text{-}(A\text{-}PO\text{-}A\text{-}PS')_n$, wherein PS' represents a polyorganosiloxane block terminated with an alkoxy-substituted silicon atom of the formula $-Si(R')_2(OR)$, PO represents a polyoxyalkylene block, A represents a divalent moiety, and n has a value of at least 1 can be produced. The reaction of the Si—H terminated polyorganosiloxane polyoxyalkylene block copolymer with the ethylenically unsaturated alkoxysilane can be carried out using the same catalysts and reaction conditions as described above for the reaction of a Si—H terminated polyorganosiloxane with an ethylenically unsaturated polyether.

The crosslinking agent, if used, can also be prepared by a hydrosilylation reaction. For example, a Si—H terminated polyorganosiloxane can be reacted with an ethylenically unsaturated alkoxysilane. Alternatively, a polyorganosiloxane containing ethylenically unsaturated groups can be reacted with a polysiloxane containing a Si—H group and at least one Si-alkoxy group.

A polyorganosiloxane polyoxyalkylene copolymer terminated with reactive groups of the formula $Si(R')(OR)_2$ has 2 or 3 reactive Si-bonded alkoxy groups at each end of the copolymer chain. It does not need to be reacted with a highly functional or branched crosslinker to form a network. The crosslinker used with such a polyorganosiloxane polyoxyalkylene copolymer can for example be a polydiorganosiloxane, for example a polydimethylsiloxane, terminated with Si-alkoxy groups such as groups of the formula $-Si(R')(OR)_2$.

Such an alkoxy-terminated polydiorganosiloxane can be prepared by reaction of a Si—H terminated polydiorganosiloxane with an ethylenically unsaturated alkoxy-silane of the formula $Z-Si(R')(OR)_2$ in the presence of a platinum group metal catalyst. The polydiorganosiloxane can for example be a polydimethylsiloxane with a DP in the range of 4 to 500 siloxane units.

The crosslinking agent for the polyorganosiloxane polyoxyalkylene copolymer terminated with reactive groups of the formula —Si(R')(OR)$_2$ can alternatively or additionally comprise a branched polyorganosiloxane containing —Si(R')$_2$(OR) groups, wherein R and R' are defined as above. The branched polyorganosiloxane can for example be a Q-branched polysiloxane in which each branch is terminated with a —Si(R')$_2$(OR) group. Such branched polyorganosiloxanes can be formed by the reaction of an ethylenically unsaturated branched polyorganosiloxane, for example the vinyl-functional Q-branched siloxane described above, with a short chain polysiloxane containing a Si—H group and a group of the formula —Si(R')$_2$(OR), for example a polysiloxane of the formula

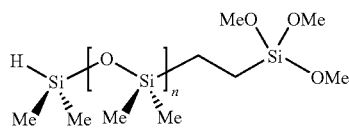

in the presence of a platinum group metal catalyst. The branched polyorganosiloxane crosslinking agent can alternatively be prepared from a branched polyorganosiloxane containing Si—H groups, for example a Q-branched polysiloxane having terminal dimethyl hydrogen silyl groups, with an ethylenically unsaturated alkoxysilane of the formula Z—Si(R')(OR)$_2$.

It may be preferred to use a mixture of an alkoxy-terminated polydiorganosiloxane with an alkoxy-terminated Q-branched polysiloxane.

Additional Ingredients

The coating composition used in the present invention may further comprise one or more excipients and/or fillers, one or more pigments or dyes, moisture scavengers, and unreactive fluids.

Examples of suitable excipients or fillers are barium sulphate, calcium sulphate, calcium carbonate, silicas or silicates (such as talc, feldspar, and china clay), including pyrogenic silica, bentonite and other clays, and solid silicone resins, which are generally condensed branched polysiloxanes, such as a silicone resin comprising Q units of the formula SiO$_{4/2}$ and M units of the formula R'''$_3$SiO$_{1/2}$, wherein the R''' substituents are selected from alkyl groups having 1 to 6 carbon atoms and the ratio of M units to Q units is in the range of 0.4:1 to 1:1.

Examples of pigments include black iron oxide, titanium dioxide, metallic flake materials (e.g. aluminium flakes), or other so-called barrier pigments or anti-corrosive pigments such as zinc dust or zinc alloys. The pigment volume concentration preferably is in the range of 0.5-25%.

Suitable unreactive fluids are silicone oils such as methylphenyl silicone oil, petroleum oils, polyolefin oils, polyaromatic oils, fluoro resins such as polytetra-fluoroethylene or fluid fluorinated alkyl- or alkoxy-containing polymers, or combinations thereof. A preferred unreactive fluid is methylphenyl silicone oil. The proportion of unreacted fluid is preferably 5-25 wt %, more preferably 5-10 wt %, based on the solids content of the coating composition.

The coating composition preferably has a solids content, defined as the weight percentage of involatile material, of 35 wt %, more preferably at least 50 wt %, even more preferably at least 70 wt %. The solids content can range up to 100 wt %, preferably up to 95 wt %, more preferably up to 90 wt %, and most preferably up to 80 wt %.

The Coating

The coating composition according to the present invention allows the formation of a cured coating that is essentially water-insoluble and has hydrophilic properties.

The thickness of the coating layer when dry is preferably in the range of 50 to 400 microns, more preferably in the range of 75 to 250 microns, and most preferably 100 to 200 microns.

The coating is especially suitable to physically deter fouling by aquatic organisms such as algae, barnacles, and mussels on underwater structures, such as ships' hulls, cooling water inlets of power stations, fish farming equipment, and the underwater and splash-zone surfaces of oil production platforms.

EXAMPLES

Example 1

37.5 g of the polyethylene glycol diallyl ether of average DP 10 were placed in 31.20 g toluene in a 3-necked flask and heated to 65° C. under nitrogen, followed by 165 µl chloroplatinic acid catalyst, then 100 g dimethyl hydrogen silyl-terminated polydimethylsiloxane fluid of average DP 6.7 being added dropwise. The molar ratio of Si:H groups to allyl groups was 3:1. The mixture was heated for 1 hour at 80° C., then cooled to form a solution of a Si—H-terminated polysiloxane polyoxyethylene block copolymer of Si—H content 5.36%.

The polymer solution produced above was mixed with 2% by weight of a platinum vinyl siloxane complex dissolved in a vinyl siloxane copolymer at 0.5% platinum and with a vinyl-terminated Q-branched polysiloxane of the formula

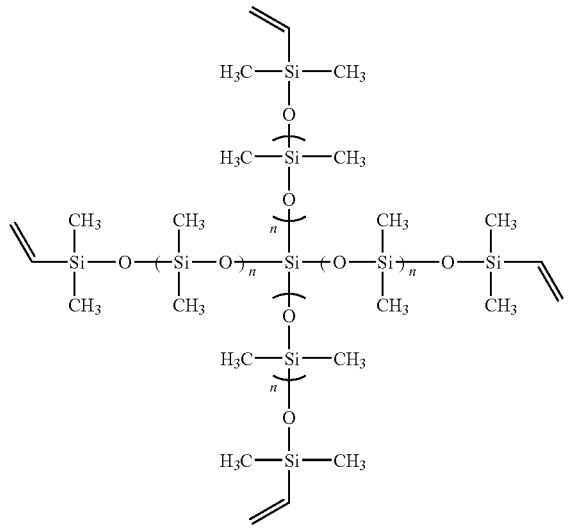

having a total of 100 siloxane D units to give a molar ratio of Si:H groups of the Si—H-terminated polysiloxane polyoxyethylene block copolymer to vinyl groups of 1.4:1. The mixture was applied to a test plate surface and was left for 1 hour at ambient temperature. The composition cured to a water-insoluble coating.

Example 2

Example 1 was repeated, with the Q-branched crosslinking agent being replaced by a Q-branched polysiloxane of the same general formula but containing a total of 225 siloxane D units, maintaining the Si—H to vinyl molar ratio at 1.4:1. The mixture was applied to a test plate surface and was left for 1 hour at ambient temperature. The resulting coating was softer than the coating obtained in Example 1.

Example 3

Example 1 was repeated, with the Q-branched crosslinking agent being replaced by a Q-branched polysiloxane of the same general formula but containing a total of 4 siloxane D units, maintaining the Si—H to vinyl molar ratio at 1.4:1. The mixture was applied to a test plate surface and was left for 1 hour at ambient temperature. The resulting coating was harder and more brittle than the cured composition of Example 1.

Examples 4 and 5

The Si—H-terminated polysiloxane polyoxyethylene block copolymer produced in Example 1 was mixed with an equal weight of a Si—H-terminated polydimethylsiloxane of substantially the same Si—H content. This mixture was mixed with 2% by weight of a platinum vinyl siloxane complex dissolved in a vinyl siloxane copolymer at 0.5% platinum and with a vinyl-terminated Q-branched polysiloxane to give a Si—H to vinyl ratio of 1.4:1. The Q-branched polysiloxane contained 100 siloxane D units (Example 4) or 225 siloxane D units (Example 5). The resulting compositions were applied to a test surface and cured as described in Example 1. Water-insoluble coatings were produced.

Examples 6 to 8

The Si—H-terminated polysiloxane polyoxyethylene block copolymer produced in Example 1 was mixed with a Si—H-terminated polydimethylsiloxane of substantially the same Si—H content in the weight ratios 50:50 (Example 6), 30:70 (Example 7), and 10:90 (Example 8). Each of these mixtures was mixed with 2% by weight of a platinum vinyl siloxane complex dissolved in a vinyl siloxane copolymer at 0.5% platinum and with the vinyl-terminated Q-branched polysiloxane of Example 3 to give a Si—H to vinyl ratio of 1.4:1. The resulting compositions were applied to a test surface and cured as described in Example 1. Water-insoluble hydrophilic coatings were produced.

Examples 9 to 11

A Si—H-terminated polysiloxane polyoxyethylene block copolymer was prepared as described in Example 1, but with the polydimethylsiloxane fluid being replaced by a dimethyl dihydrogen silyl-terminated polydimethylsiloxane fluid of average DP 19 and the polyethylene glycol diallyl ether being replaced by 6.20 g of a polyethylene glycol diallyl ether of average DP 4.5 (Si—H:allyl ratio 3:1). The polysiloxane polyoxyethylene block copolymer produced had a Si—H content of 2.85%.

In Examples 9 to 11, this polysiloxane polyoxyethylene block copolymer was cured by the vinyl-terminated Q-branched polysiloxanes of Examples 1, 2, and 3, respectively. The amount of vinyl-terminated polysiloxane was such as to give a Si—H to vinyl ratio of 1.2 (Examples 9 and 10) or 1.4 (Example 11). A water-insoluble hydrophilic coating was produced in each Example. Generally, the coatings were somewhat harder than the corresponding coatings of Examples 1 to 3.

Examples 12 to 14

The Si—H-terminated polysiloxane polyoxyethylene block copolymer produced in Example 9 was mixed with a Si—H-terminated polydimethylsiloxane of substantially the same Si—H content in the weight ratios 50:50 (Example 12), 30:70 (Example 13), and 10:90 (Example 14). Each of these mixtures was mixed with 2% in weight of a platinum vinyl siloxane complex dissolved in a vinyl siloxane polymer at 0.5% platinum and the vinyl-terminated Q-branched polysiloxane of Example 3 to give a Si—H to vinyl ratio of 1.4:1. The resulting compositions were applied to a test surface and cured as described in Example 1. Water-insoluble hydrophilic coatings were produced.

Example 15

A Si—H-terminated polysiloxane polyoxyethylene block copolymer was prepared as described in Example 9. The block copolymer had a Si—H content of 2.42% and contained residual catalyst. 100 g of the Si—H-terminated polysiloxane polyoxyethylene block copolymer were placed in 30 g toluene in a 3-necked flask and heated to 65° C. under nitrogen. 37.16 g vinyl trimethoxysilane were added dropwise. The molar ratio of Si:H groups to vinyl groups was 1:3. The mixture was heated for 1 hour at 80° C., then cooled to form a solution of a polysiloxane polyoxyethylene block copolymer terminated with $Si(CH_3)_2$—$CH_2CH_2$—$Si(OCH_3)_3$ groups. This copolymer had a number average molecular weight Mn of 3,535 and contained 6.95% by weight methoxy groups.

The Si-methoxy terminated copolymer of Example 15 was mixed with titanium tetra-n-butoxide catalyst to a level of 0.1% by weight Ti based on copolymer, applied to a test surface, and allowed to cure in a moist atmosphere at ambient temperature. A hydrophilic coating was produced.

Example 16

The vinyl-terminated Q-branched polysiloxane of Example 3 was reacted with a Si—H-terminated trimethoxysilyl-functional polydimethylsiloxane of the form

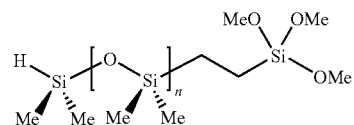

having a DP of 4, in the presence of 2% by weight of a platinum vinyl siloxane complex dissolved in a vinyl siloxane copolymer at 0.5% platinum to produce a branched Si-methoxy-functional crosslinker of Mn 1,657 and a methoxy content of 25.55% by weight.

The Si-methoxy-terminated copolymer of Example 15 (9.09 g) was blended with 0.91 g of the Si-methoxy-terminated branched crosslinker and titanium tetra-n-butoxide catalyst to a level of 0.1% by weight Ti based on total siloxane, and the mixture was applied to a test surface and allowed to cure in a moist atmosphere at ambient temperature. A hydrophilic coating was produced.

Examples 17 to 19

Example 16 was repeated, except that the Si-methoxy-terminated copolymer of Example 15 was partly replaced by a Si-methoxy-terminated polydimethylsiloxane in weight ratios of 50:50 (Example 17), 30:70 (Example 18), and 10:90 (Example 19). The polydimethylsiloxane was terminated with $Si(CH_3)_2$—$CH_2CH_2$—$Si(OCH_3)_3$ groups and had a similar molecular weight and methoxy content to the copolymer of Example 15. Each composition cured to a hydrophilic coating.

Example 20

Following the procedure of Example 15, 100 g of the Si—H-terminated polysiloxane polyoxyethylene block copolymer prepared in Example 1 were reacted with 85.46 g vinyl trimethoxysilane (Si—H to vinyl ratio 1:3) to produce a polysiloxane polyoxyethylene block copolymer of Mn 1,754 terminated with $Si(CH_3)_2$—$CH_2CH_2$—$Si(OCH_3)_3$ groups and having a methoxy content of 18.47% by weight.

The Si-methoxy-terminated copolymer of Example 20 was mixed with titanium tetra-n-butoxide catalyst to a level of 0.1% by weight Ti, applied to a test surface, and allowed to cure in a moist atmosphere at ambient temperature. A hydrophilic coating was produced.

Example 21

The Si-methoxy-terminated copolymer of Example 20 (9.03 g) was blended with 0.97 g of the Si-methoxy-terminated branched crosslinker described in Example 16 and titanium tetra-n-butoxide catalyst to a level of 0.1% by weight Ti, and the mixture was applied to a test surface and allowed to cure in a moist atmosphere at ambient temperature. A hydrophilic coating was produced.

Examples 22 to 24

Example 21 was repeated, except that the Si-methoxy-terminated copolymer of Example 20 was partly replaced by a Si-methoxy-terminated polydimethylsiloxane in weight ratios of 50:50 (Example 22), 30:70 (Example 23), and 10:90 (Example 24). The polydimethylsiloxane was terminated with $Si(CH_3)_2$—$CH_2CH_2$—$Si(OCH_3)_3$ groups and had a similar molecular weight and methoxy content to the copolymer of Example 20. Each blend was mixed with titanium tetra-n-butoxide catalyst to a level of 0.1% by weight Ti, applied to a test surface, and allowed to cure in a moist atmosphere at ambient temperature. Each composition cured to a hydrophilic coating.

Example 25

100 g dimethyl hydrogen silyl-terminated polydimethylsiloxane fluid of average DP 11.8 were placed in 50 g toluene in a 3-necked flask and heated to 80° C. under nitrogen. 1 drop of polyethylene glycol diallyl ether of average DP 7 was added followed by 30 µl chloroplatinic acid catalyst, then 12.76 g of the polyethylene glycol diallyl ether were added dropwise. The molar ratio of Si:H groups to allyl groups was 3:1. The mixture was heated for 1 hour at 80° C., then cooled to form a solution of a Si—H-terminated polysiloxane polyoxyethylene block copolymer of Si—H content 3.10%.

100 g of this Si—H-terminated polysiloxane polyoxyethylene block copolymer were placed in 50 g toluene in a 3-necked flask and heated to 80° C. under nitrogen. 30 µl chloroplatinic acid catalyst were added, then 54.75 g vinyl trimethoxysilane were added dropwise. The molar ratio of Si:H groups to vinyl groups was 1:3. The mixture was heated for 1 hour at 80° C., then cooled to form a solution of a polysiloxane polyoxyethylene block copolymer terminated with $Si(CH_3)_2$—$CH_2CH_2$—$Si(OCH_3)_3$ groups. This copolymer had a number average molecular weight Mn of 2,611 and contained 10.26% by weight methoxy groups.

The Si-methoxy-terminated copolymer of Example 25 was mixed with titanium tetra-n-butoxide catalyst to a level of 0.1% by weight Ti based on copolymer, applied to a test surface, and allowed to cure in a moist atmosphere at ambient temperature. A hydrophilic polymer coating was produced.

Example 26

Anti-Fouling Testing

The coating compositions of Examples 11-14 were applied by brush (to a dry film thickness of ~300 µm) to 60 cm×60 cm marine plywood panels, which were primed with two coatings of epoxy primer and an acrylic tiecoat. Six samples of each coating composition were applied. Standard antifouling coatings and non-toxic controls were applied as references in order to assess the relative performance and the abundance and diversity of fouling settlement on the coatings according to the invention.

The test panels were immersed from rafts designed for the immersion of experimental test surfaces and the conditions were representative of conditions experienced by hulls of pleasure craft or ships.

The panels were attached to test frames and suspended vertically to between 0.5 and 1.5 m below the water surface at each test site. The panels were inspected regularly for biofouling presence and coating integrity.

The test sites included: Changi, Singapore and Newton Ferrers, UK, which show typical fouling from all major fouling classes.

Fouling coverage was assessed in four main ecologically derived fouling categories: Microfouling, Weed, Soft-bodied animal, and Hard-bodied animal, and analysis was carried out visually on these four fouling categories, as this provided sufficient information to differentiate between coating performances whilst allowing some general comparisons to be made between test sites. The results are shown in the Table below. The data in this Table refers to total fouling coverage of the test panel surfaces, in percentages.

TABLE

| | Changi, Singapore, 17 weeks | Newton Ferrers, UK, 26 weeks |
|---|---|---|
| Example 11 | 64.0 | 5.3 |
| Example 12 | 45.0 | 3.0 |
| Example 13 | 34.0 | 15.0 |
| Example 14 | 58.0 | 26.3 |
| Standard antifouling coating | 83.0 | 20.0 |
| Only anticorrosive primer | 93.0 | 95.0 |

This Table shows that after four months of immersion in Singapore waters and six months of immersion in the UK, the accumulated fouling was significantly less than that of control substrates coated only with the anticorrosive primer, and less than that of a standard substrate. Any fouling on the coatings of Examples 11-14 could be removed very easily by light rubbing, whereas accumulated fouling on the control substrates could not be removed in a similar way.

The invention claimed is:

1. A process to physically deter fouling from a substrate in an aquatic fouling environment, which process comprises forming a coating on the substrate, before exposure to the said environment, the coating being formed from a coating composition comprising (i) a curable polyorganosiloxane polyoxyalkylene block copolymer of the form PS-(A-PO-A-PS)$_n$, wherein PS represents a polyorganosiloxane block, PO represents a polyoxyalkylene block, A represents a divalent moiety, and n has a value of 10-250, and wherein at least two reactive groups X are situated on the copolymer chain and (ii) an organosilicon crosslinking agent and/or a catalyst, and then exposing the coated substrate to an aquatic fouling environment.

2. The process according to claim 1 wherein said groups X are reactive with each other and wherein the coating composition comprises a catalyst and optionally a crosslinking agent.

3. The process according to claim 1 wherein said groups X are not reactive with each other and wherein the coating composition comprises an organosilicon crosslinking agent having at least two groups Y reactive with the said groups X.

4. The process according to claim 3 wherein the polyorganosiloxane polyoxyalkylene block copolymer has two reactive groups X on a polyorganosiloxane block per molecule and wherein the organosilicon crosslinking agent has on average more than two reactive groups Y per molecule.

5. The process according to claim 3 wherein the reactive groups X are Si—H groups and the crosslinking agent contains ethylenically unsaturated groups Y.

6. The process according to claim 5 wherein the coating composition contains a catalyst comprising a platinum group metal and is packaged in two containers, so that the polyorganosiloxane polyoxyalkylene block copolymer, the crosslinking agent, and the catalyst are not all together in the same package.

7. The process according to claim 1 wherein the reactive groups X are Si-alkoxy groups which are reactive with each other and if an organosilicon crosslinking agent is present, the reactive groups Y are also Si-alkoxy groups.

8. The process according to claim 7 wherein the reactive groups X are of the formula —Si(R')$_2$(OR), wherein R represents an alkyl group having 1 to 4 carbon atoms and each R' represents an alkyl group having 1 to 6 carbon atoms, a phenyl group, or an alkoxy group of the formula —OR.

9. The process according to claim 7 wherein the composition contains a siloxane condensation catalyst and the composition is packed in a moisture-proof container.

10. The process according to claim 7 wherein each PS block is a polydimethylsiloxane block.

11. The process according to claim 1 wherein the reactive groups X are Si-alkoxy groups which are reactive with each other and if an organosilicon crosslinking agent is present, the reactive groups Y are silanol groups.

12. The process according to claim 1 wherein the reactive groups X are silanol groups which are reactive with each other and if an organosilicon crosslinking agent is present, the reactive groups Y are selected from alkoxy, acetoxy, ketoxime, amide or hydroxyl groups bonded to silicon.

13. The process according to claim 1, wherein at least 50% of the polyoxyalkylene units in the polyoxyalkylene blocks are oxyethylene units.

14. A substrate coated with a coating obtained by
a) applying on the surface a coating composition comprising (i) a curable polyorganosiloxane polyoxyalkylene block copolymer of the form PS-(A-PO-A-PS)$_n$, wherein PS represents a polyorganosiloxane block, PO represents a polyoxyalkylene block, A represents a divalent moiety, and n has a value of 10-250, and wherein at least two reactive groups X are situated on the copolymer and (ii) an organosilicon crosslinking agent and/or a catalyst and
b) subsequently curing the coating composition.

15. The substrate according to claim 14 wherein the substrate is an underwater structure.

\* \* \* \* \*